United States Patent [19]

Kobayashi et al.

[11] Patent Number: 5,379,196
[45] Date of Patent: Jan. 3, 1995

[54] PROJECTION HEADLAMP FOR VEHICLES

[75] Inventors: Shoji Kobayashi; Toshihisa Hayami; Masaaki Ishikawa, all of Shizuoka, Japan

[73] Assignee: Koito Manufacturing Co., Ltd., Tokyo, Japan

[21] Appl. No.: 70,902

[22] Filed: Jun. 3, 1993

[30] Foreign Application Priority Data

Jun. 5, 1992 [JP] Japan .................. 4-146027

[51] Int. Cl.$^6$ .............................................. B60Q 1/06
[52] U.S. Cl. .................................. 362/61; 362/283; 362/322; 362/343; 362/360
[58] Field of Search .................. 362/61, 282, 283, 284, 362/319, 322, 323, 324, 360, 308, 343, 347

[56] References Cited

U.S. PATENT DOCUMENTS

| | | | |
|---|---|---|---|
| 1,513,848 | 11/1924 | Moore | 362/283 |
| 1,834,542 | 12/1931 | Karlebo | 362/61 |
| 3,604,922 | 9/1971 | Steel | 362/284 |
| 4,875,141 | 10/1989 | Miyauchi et al. | 362/61 |
| 4,891,738 | 1/1990 | Richardson | 362/282 |
| 4,899,267 | 2/1990 | Mardon | 362/284 |
| 4,967,319 | 10/1990 | Seko | 362/61 |
| 5,060,120 | 10/1991 | Kobayashi et al. | 362/61 |
| 5,068,768 | 11/1991 | Kobayashi | 362/61 |
| 5,138,540 | 8/1992 | Kobayashi et al. | 362/268 |
| 5,213,406 | 5/1993 | Neumann et al. | 362/61 |

*Primary Examiner*—Ira S. Lazarus
*Assistant Examiner*—Alan Cariaso
*Attorney, Agent, or Firm*—Sughrue, Mion, Zinn, Macpeak & Seas

[57] ABSTRACT

A projection headlamp for vehicles has a substantially elliptical reflector 14, a light source (bulb) located at the first focal point F1 of the reflector 14, a projection lens 16 disposed in front of the reflector 14, and a shade 20 located at a position near to the second focal point F2 and the focal point of the projection lens 16. The shade 20 partially intercepts light beams going from the reflector 14 toward the projection lens 16. The shade 20 is allowed to turn about the horizontal shaft 23 of the reflector 14 to adjust the beam distribution pattern. The shade 14 includes right and left shades 21 and 22, which are separated and horizontally extended when seen from the point substantially right under the optical axis L, and are allowed to independently turn about the horizontal shaft 23.

8 Claims, 8 Drawing Sheets

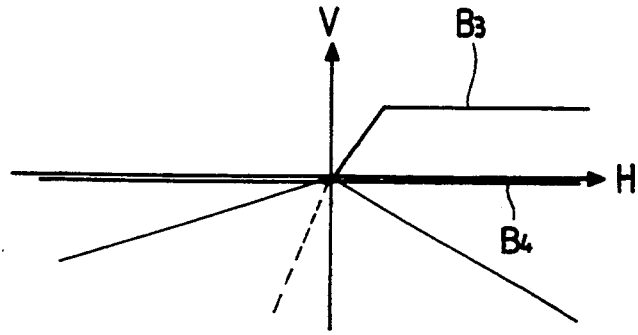
FIG. 13
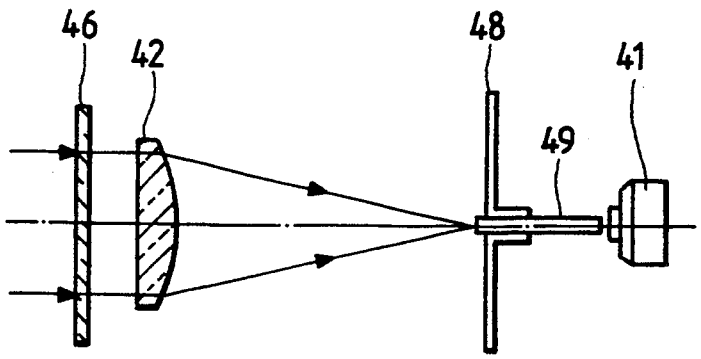
FIG. 14
FIG. 15
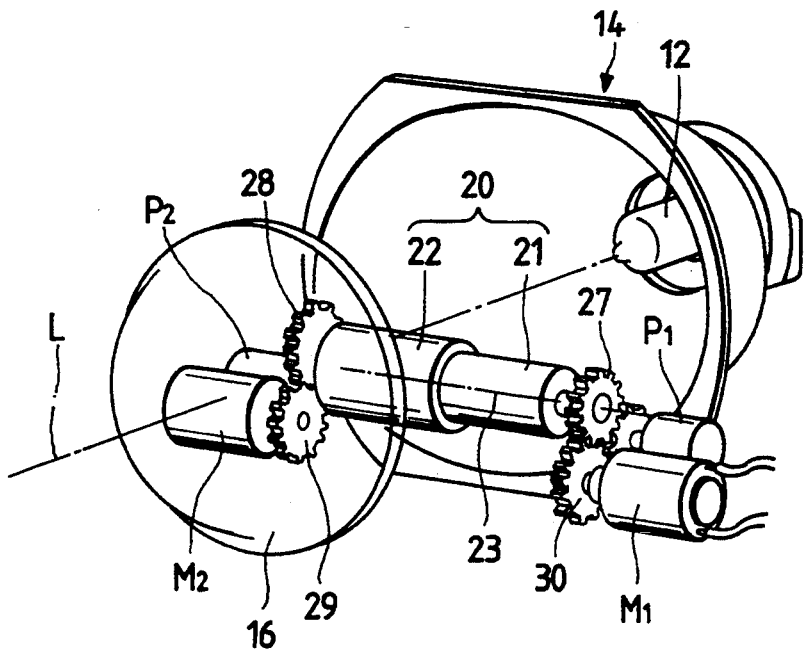

PROJECTION HEADLAMP FOR VEHICLES

BACKGROUND OF THE INVENTION

The present invention relates generally to a projection headlamp of the type in which light beams reflected by a substantially elliptical reflector are projected forward by a projection lens. More particularly, the invention relates to a projection headlamp for vehicles capable of selectively changing a beam distribution pattern from one pattern to another by tilting a shade.

Conventional headlamps of this type are disclosed in Unexamined Japanese Utility Model Application (OPI) No. Sho. 63-41801 and Unexamined Japanese Patent Application (OPI) No. Sho. 1-213901. The headlamp of the Utility Model Application is constructed as shown in FIG. 19. As shown, a light source 3 is positioned at the first focal point F1 of a reflector 2 shaped substantially elliptical, and a shade 4 is positioned at the second focal point F2. A projection lens 5 is located in front of the shade 4. In the headlamp thus constructed, for selectively changing a beam distribution pattern from one beam pattern to another, the shade 4 is turned about a horizontal support shaft O, to partially intercept light beams directed toward a projection lens 5. Reference numeral 1 designates a lamp body, and numeral 6, a front lens.

The headlamp of the Patent Application employs shade turning means different from that of the conventional apparatus, $Utility Model Application, but the headlamps are both based on the same idea that, to select the main beam distribution pattern or the sub-beam distribution pattern, the shade is turned.

The prior headlamp is capable of selecting one of only two patterns, the main beam distribution pattern and the sub-beam distribution pattern. In other words, it cannot select a beam distribution pattern, e.g., a medium beam distribution pattern of a middle state between the main beam and sub-beam distribution patterns. In a highway drive, as the running speed of the vehicle is higher, the beam distribution pattern of the headlamp, when it is closer to the main beam distribution pattern, will provide a better visual recognition of the driver, but will give a more intensive glare to the driver of the vehicles running in the opposite direction. In this case, it is very convenient if the medium beam distribution pattern can be used, which will not give a glare till the vehicles running in the opposite directions come near to each other within a preset distance. There is no prior art which can select any of other beam distribution patterns than the main beam distribution pattern and the sub-beam beam distribution pattern, in addition to the latter ones. In this respect, the market of this field demands the development of this type of headlamp.

SUMMARY OF THE INVENTION

Accordingly, an object of the present invention is to provide a projection headlamp for vehicles which can select any of other beam distribution patterns than the main beam distribution pattern and the sub-beam beam distribution pattern, in addition to the latter ones.

The above and other objects can be achieved by a provision of a projection headlamp for vehicles which, according to the present invention, includes a substantially elliptical reflector, a light source located at the first focal point of the reflector, a projection lens disposed in front of the reflector, and a shade located at a position near to the second focal point and the focal point of the projection lens, the shade partially intercepting light beams going from the reflector toward the projection lens, and the shade being allowed to turn about the horizontal shaft of the reflector to adjust the beam distribution pattern, wherein the shade includes right and left shades, which are separated and horizontally extended when seen from the point substantially right under the optical axis, and are allowed to independently turn about the horizontal shaft.

According to the present invention, further, the right and left shades, respectively, consist of tubular rotary members, and at least one of the right and left shades is supported by a horizontal support shaft having the axis away from the center of rotation of the shade.

When the shade is turned about the horizontal shaft, the distance of the shade to the optical axis varies. Accordingly, the distribution pattern (clear cut line) varies with the turn of the shade. Further, the right and left shades can be turned independently. Accordingly, various beam distribution patterns can be formed by independently adjusting the quantities of the turns of the right and left shades.

BRIEF DESCRIPTION OF THE DRAWINGS

FIG. 13 is a diagram showing shapes of the clear cut lines in the beam distribution pattern formed by the headlamp with the FIG. 12 shade;

FIG. 14 is a diagram showing the construction of another photo sensor, which may be used in place of the photo sensor used in the second embodiment;

FIG. 15 is a perspective view showing the inner structure of a projection headlamp for vehicles according to a third embodiment of the present invention;

DESCRIPTION OF THE PREFERRED EMBODIMENTS

Figure 1:
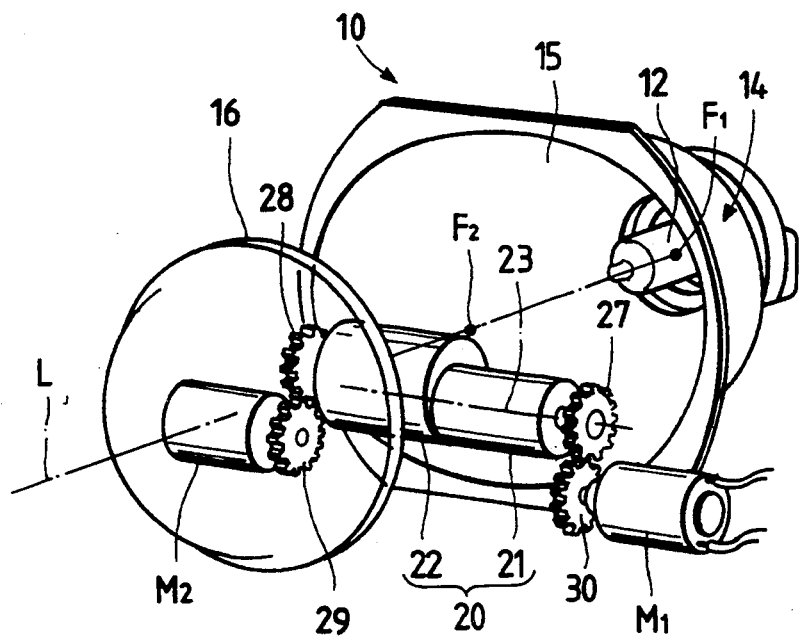
FIG. 1 is a perspective view showing the inner structure of a projection headlamp for vehicles according to an embodiment of the present invention.
Figure 2:
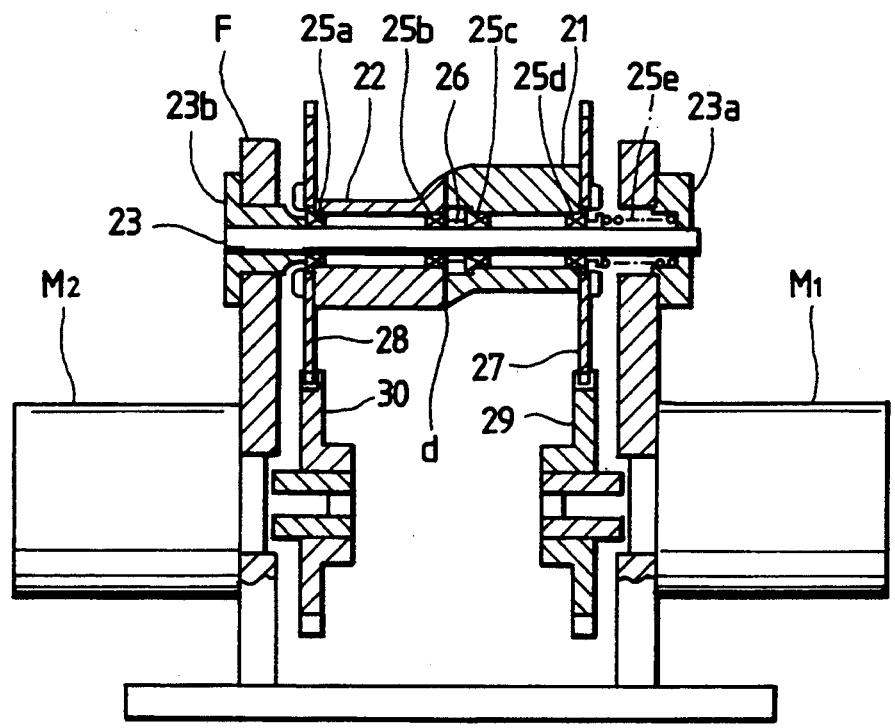
FIG. 2 is a longitudinal sectional view showing the right and left shades used in the headlamp of FIG. 1.
Figure 3:
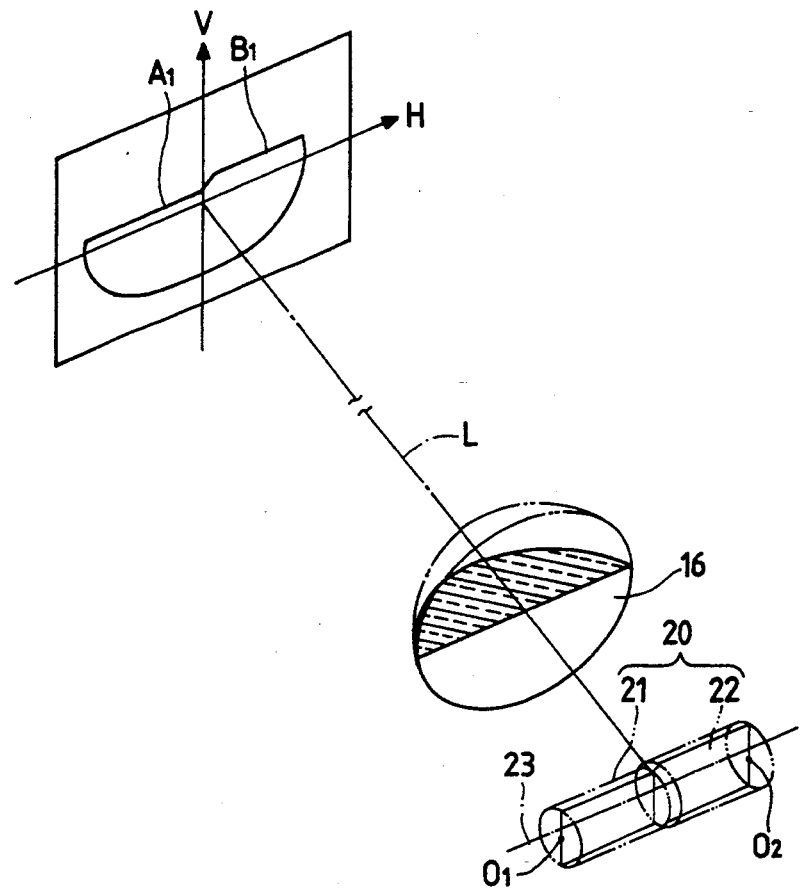
FIG. 3 is a perspective view showing a beam distribution pattern formed by the shade and the headlamp when seen from the driver.
Figure 4:
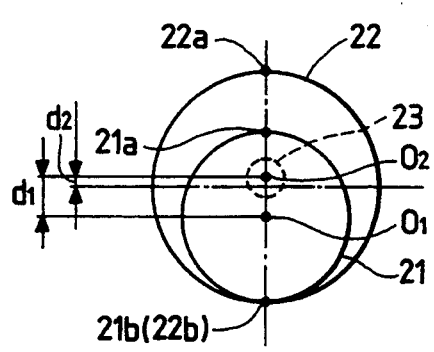
FIG. 4 is a diagram useful in explaining the shape of the shade used in the headlamp of FIG. 1.
Figure 5:
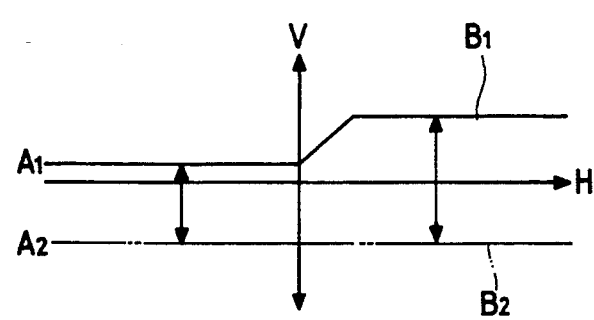
FIG. 5 is a diagram showing shapes of the clear cut lines in the beam distribution pattern formed by the headlamp.

In FIGS. 1 through 5 showing a projection headlamp for vehicles according to an embodiment of the present invention, FIG. is a perspective view showing the inner structure of a projection headlamp for vehicles according to an embodiment of the present invention, FIG. 2 is a longitudinal sectional view showing the right and left shades used in the headlamp of FIG. 1, FIG. 3 is a perspective view showing a beam distribution pattern formed by the shade and the headlamp when seen from the driver, FIG. 4 is a diagram useful in explaining the shape of the shade, and FIG. 5 is a diagram showing shapes of the clear cut lines in the beam distribution pattern formed by the headlamp.

In those figures, a projection unit 10, supported by an aiming mechanism (not shown), is contained in a lamp body shaped like a capsule (also not shown). The projection unit 10 is tiltable about the horizontal shaft and the vertical shaft (not shown) by the aiming mechanism. The aiming direction of the light beams projected from the projection unit 10, viz., the projection axis (optical axis) L of the headlamp, can be tilted back and forth as well as to the left and right through the aiming mechanism.

The projection unit 10 includes a substantially elliptical reflector 14 inserted into a discharge bulb 12 and a projection lens 16 located in front of the reflector 14, the reflector 14 and the projection lens 16 being firmly coupled together into a one-piece construction. The projection lens 16 is supported by a lens holder (not shown) fastened to the reflector 14 by means of screws. An elliptical reflecting surface 15 having first and second focal points F1 and F2 (this technique is well known) is formed on the inner side of the reflector 14. A discharge part of a discharge bulb 12 is located at the first focal point F1. A shade 20 is located at the focal position of the projection lens 16, near to the second focal point F2. The shade 20 shades part of the light beams which are reflected by the reflector 14 and go to the projection lens 16, thereby forming a clear cut line. The light beams emitted from the discharge bulb 12 are reflected by the reflecting surface 15 and guided forward, and arranged into substantially parallel light beams by the projection lens 16.

As illustrated in FIGS. 1 and 2, the shade 20 includes a left shade 21 and a right shade 22. The right and left shades are separated and horizontally extended when seen from the point substantially right under the optical axis L. The shades 21 and 22, which are made of tubular members of different diameters, are rotatably supported by a horizontal support shaft 23. Gears 25 and 26 are fastened to the outer ends of the horizontal support shaft 23. The horizontal support shaft 23 serving as the center of rotation of the shades 21 and 22 is eccentric with respect to the axes O1 and O2 of the shades 21 and 22 as tubular rotating members. In other words, the shades 21 and 22 are eccentric with respect to the horizontal support shaft 23. When the shades 21 and 22 are turned, the clear cut lines vertically move within the ranges between A1 and A2, and B1 and B2. Eccentric quantities of the shades are denoted as d1 and d2.

The shade 20 for forming the right-side beam distribution patterns is designed according to the Europe and American specifications. In a mode shown in FIG. 4 where a point 21a of the shade 21 is at the highest position (the lowest position of the ridge of the left shade 21), the clear cut line formed by the left shade 21 is set at a position B1. When the left shade 21 is gradually turned from this position, the clear cut line gradually declines. In another mode where a point 21b of the shade is at the highest position (the lowest position of the ridge of the left shade 21), the clear cut line is set at a position B2. The clear cut line formed by the right shade 22 is set at a position A1 in a mode shown in FIG. 3 where a point 22a of the shade 22 is at the highest position (the lowest position of the ridge of the right shade 22). In another mode where a point 22b of the shade is the highest position (the lowest position of the ridge of the right shade 22), the clear cut line is set at a position A2.

Reference numerals 25a to 25d designate ball bearings. The shades 21 and 22 are rotatably supported by the horizontal support shaft 23 of which both ends are supported by a frame F. A compressed coil spring 25e pushes the shade 23 toward the shade 24. A spacer washer 26 is placed between the bearings 25b and 25c, which are coupled with the horizontal support shaft 23. A gap d, present between the shades 23 and 24, ensures a smooth independent turn of the shades 23 and 24. Gears 27 and 28 are fastened to the shades 21 and 22. These gears are respectively in mesh with drive gears 29 and 30, which are fastened to the output shafts of motors M1 and M2. The shades 21 and 22 are independently turned by the motors M1 and M2. With the independent turns of the shades, the heights and the contours of the clear cut line on the distribution screen can be variously adjusted between the lines A1 and A2, and B1 and B2 (FIG. 5), with respect to the vertical axis V.

Figure 6:
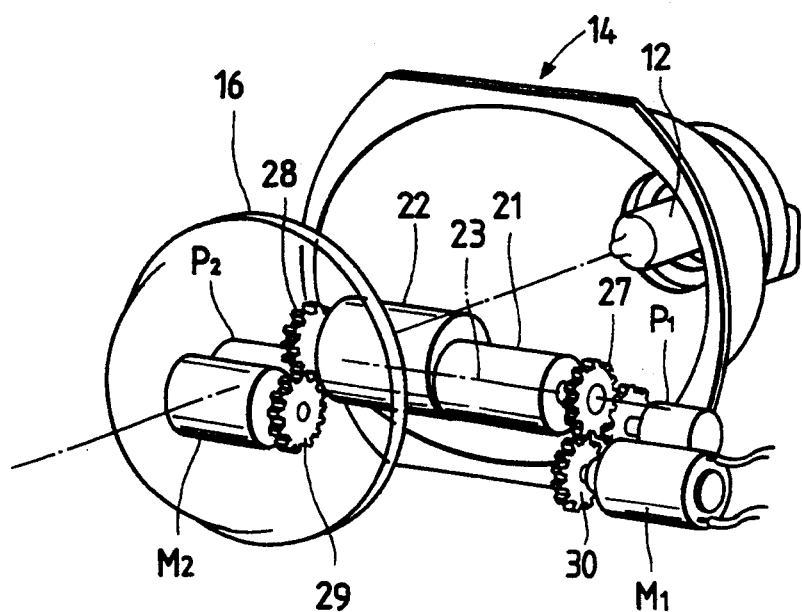
FIG. 6 is a perspective view showing the internal structure of a headlamp according to a second embodiment of the present invention.
Figure 7:
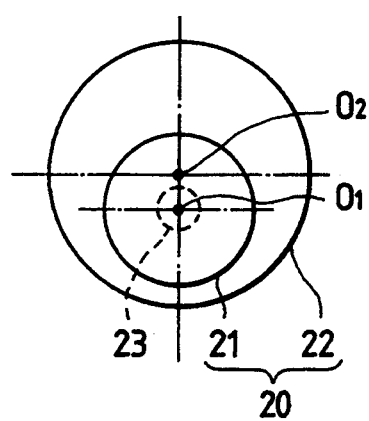
FIG. 7 is a view showing the shape of the shade in the headlamp.
Figure 8:
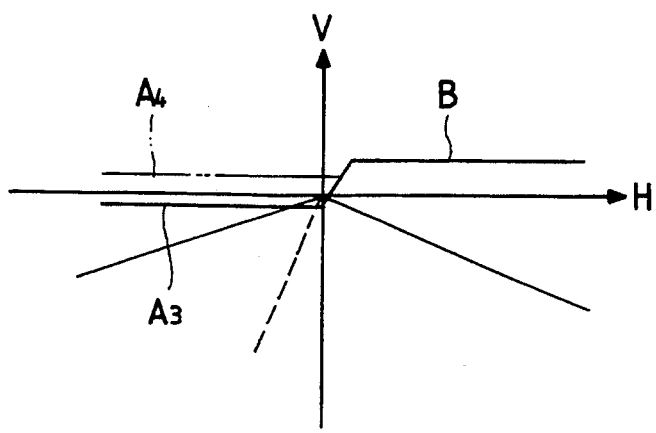
FIG. 8 is a view showing a light distribution pattern of the headlamp of FIG. 6.
Figure 9:
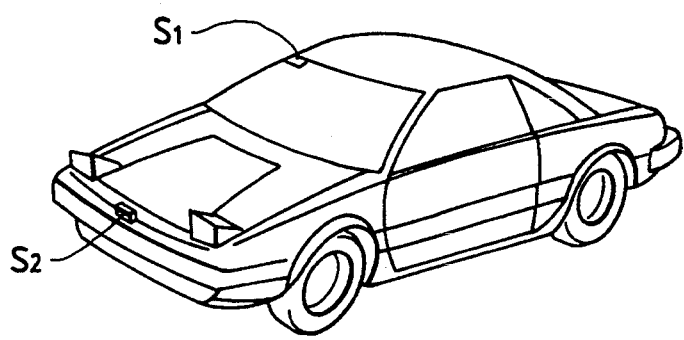
FIG. 9 is a perspective view showing a vehicle carrying photo sensors at two specific locations thereof.
Figure 10:
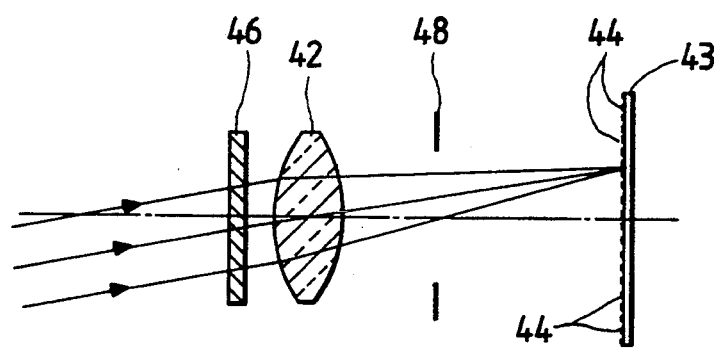
FIG. 10 is a diagram showing the construction of the photo sensor.
Figure 11:
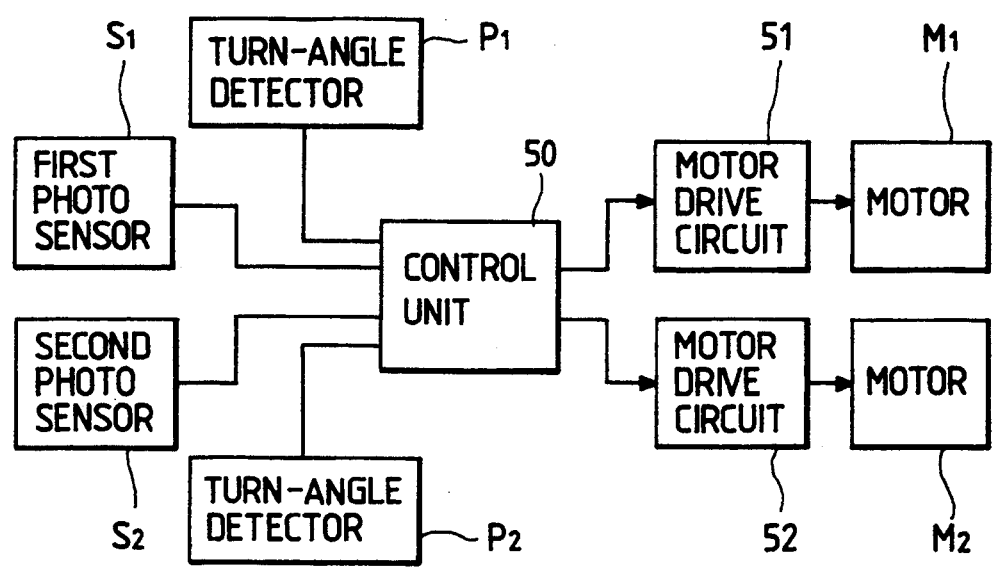
FIG. 11 is a block diagram showing a motor drive unit.

In FIGS. 6 through 11 showing a headlamp combined with a glare sensor, which is another embodiment of the present invention, FIG. 6 is a perspective view showing the internal structure of a headlamp according to a second embodiment of the present invention, FIG. 7 is a view showing the shape of the shade in the headlamp, FIG. 8 is a view showing a light distribution pattern of the headlamp of FIG. 6, FIG. 9 is a perspective view showing a vehicle carrying photo sensors thereon, FIG. 10 is a diagram showing the construction of the photo sensor, and FIG. 11 is a block diagram showing a motor drive unit.

In this embodiment, only the right shade 22 is eccentric with respect to a horizontal support shaft 23. If the left shader 21 is turned, the clear cut line corresponding to the left shader 21 is immovable. When the right shade 22 is turned, the clear cut line corresponding to the right shade, viz., the clear cut line on the left side of the vertical line V on the light distribution screen, moves vertically within the range between lines A3 and A4.

As shown in FIG. 9, a first photo sensor S1 as a glare sensor, which responds to light beams from oppositely running vehicles is mounted inside the front glass of a vehicle. A second photo sensor S2, which responds to light beams from the tail lamp of forerunning vehicles, is mounted on the front side of the front bumper. The first photo sensor S1, as shown in FIG. 10, includes a collimator lens 42 and a photo sensor unit 43 having photo sensors 44 vertically arrayed thereon, which is located at near to the focal position of the collimator lens 42. The light beams emanating from the collimator lens 42 are focused on the photo sensors 44. The photo sensor unit 43 having the photo sensors 44, when receiving the light beams, produces signals proportional to the quantities of the received light. A band-pass filter 46 allows light of the yellow wave lengths region to pass therethrough, viz., mainly the light emitted from the headlamp. Accordingly, the first photo sensor S1 responds to only the light of the headlamp. The second photo sensor S2 likewise includes a band-pass filter, which allows red light of specific wave lengths, viz., the light from the tail lamp. Accordingly, the second photo sensor S2 responds to only the red light from the tail lamp. Reference numeral 48 designates a shade plate. With provision of the shade plate 48, only light beams after passing through a limited area of the lens 42 around the center of the lens are allowed to pass toward an area of the photo sensor unit 43 where the photo sensors 44 are arrayed. The light beams passing through the remaining area of the collimator lens 42 are prohibited from going to the area containing the array of the photo sensors 44.

The quantity of light received by the photo sensor S1 (S2) is proportional to a distance between the photo sensor S1 (S2) and the oppositely running vehicle or the forerunning vehicle. If the output signal of the photo sensor S1 (S2) exceeds a preset value, the main beam emitted from the measuring vehicle may provide a glare directly to the driver of the oppositely running vehicle or through the back mirror to the driver of the forerunning vehicle. A control unit 50 checks whether or not the sensor output exceeds the preset value, or it continues for a time duration in excess of a preset time, e.g., 1 second or more. If the sensor output larger than the preset value continues over the preset time, the control unit recognizes that the vehicle drivers may suffer from glare light. Upon the recognition, the control unit outputs an instruction signal to motor drive circuits 51 and 52 so that the main beams are switched to the sub-beams by turning the shades 21 and 22. To be more specific, when the oppositely running vehicle reaches a location where it is excessively close to the measuring vehicle, the photo sensor S1 responds to the main beam from the oppositely running vehicle, the control unit 50 outputs a signal to the drive circuits 51 and 52, which in turn turns the shades 21 and 22. As a result, the light distribution pattern is switched from the main beam pattern where the clear cut line is defined by lines A4 and B in FIG. 8 to the sub-beam pattern where the clear cut line is defined by lines A3 and B in FIG. 8. When the forerunning vehicle reaches a location where it is excessively close to the measuring vehicle, the sensor responds to the light from the tail lamp of the forerunning vehicle, and the main beam pattern is switched to the sub-beam pattern as in the previous manner. P1 and P2 are turn-angle detectors, such as rotary encoders and position meters. The detectors, of which the gears are in mesh with the gears 27 and 28, detect turn angles of the shades 21 and 22, which are fed back to the control unit 50.

Figure 12:
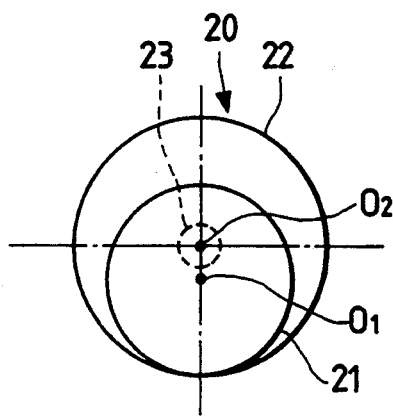
FIG. 12 is a diagram useful in explaining the shape of another shade, which may be used for the headlamp of the invention.

In FIGS. 12 and 13 showing another shade, which may be used for the headlamp of the invention, FIG. 12 is a diagram useful in explaining the shape of the shade, and FIG. 13 is a diagram showing shapes of the clear cut lines in the beam distribution pattern formed by the headlamp with the FIG. 12 shade.

In this embodiment, only the left shade 21 is eccentric with respect to a horizontal support shaft 23, while the right shade 22 is eccentric in the second embodiment. If the right shade 22 is turned, the clear cut line corresponding to the right shade 22 is immovable. When the left shade 21 is turned, the clear cut line corresponding to the right shade, viz., the clear cut line on the right side of the vertical line V on the light distribution screen, moves vertically within the range between lines B3 and B4.

FIG. 14 is a diagram showing the construction of another photo sensor, which may be used in place of the photo sensor S1 (S2) used in the second embodiment. In this photo sensor, the light beams focused by the collimator lens 42 are guided through a light guide member 49 to a photo diode 41. The remaining construction of the photo sensor is the same as that of the second embodiment. Then, no further description of the photo sensor will be given here.

Figure 16:
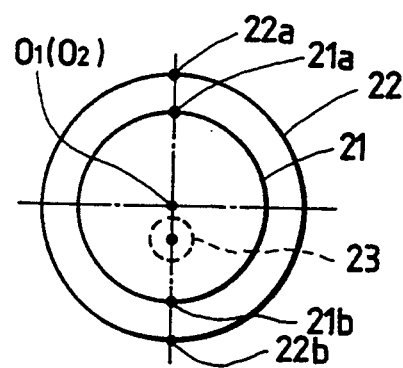
FIG. 16 is a diagram useful in explaining the shape of the shade used in the headlamp of FIG. 15.
Figure 17:
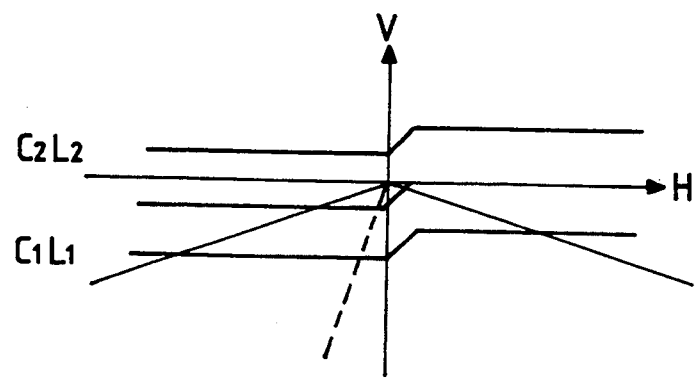
FIG. 17 is a diagram showing shapes of the clear cut lines in the beam distribution pattern formed by the headlamp.
Figure 18:
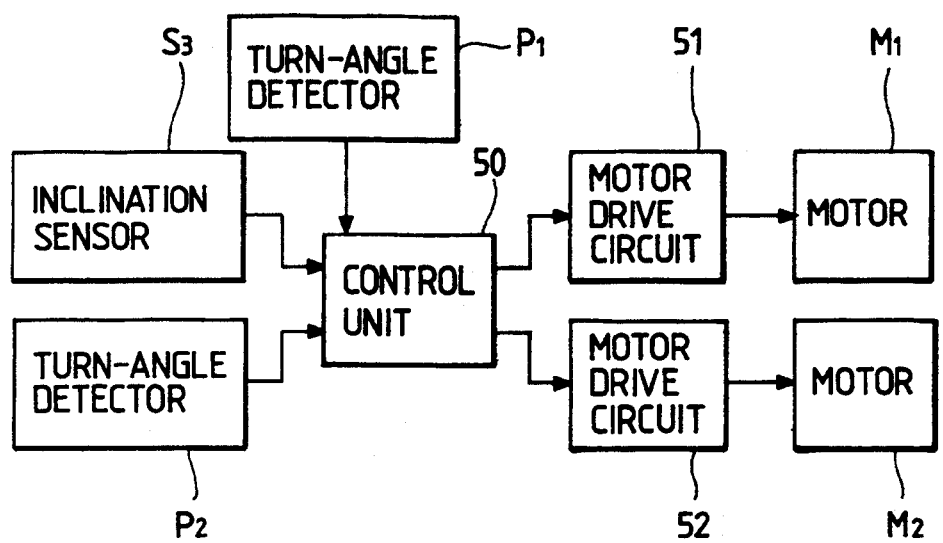
FIG. 18 is a block diagram showing a motor drive unit.
Figure 19:
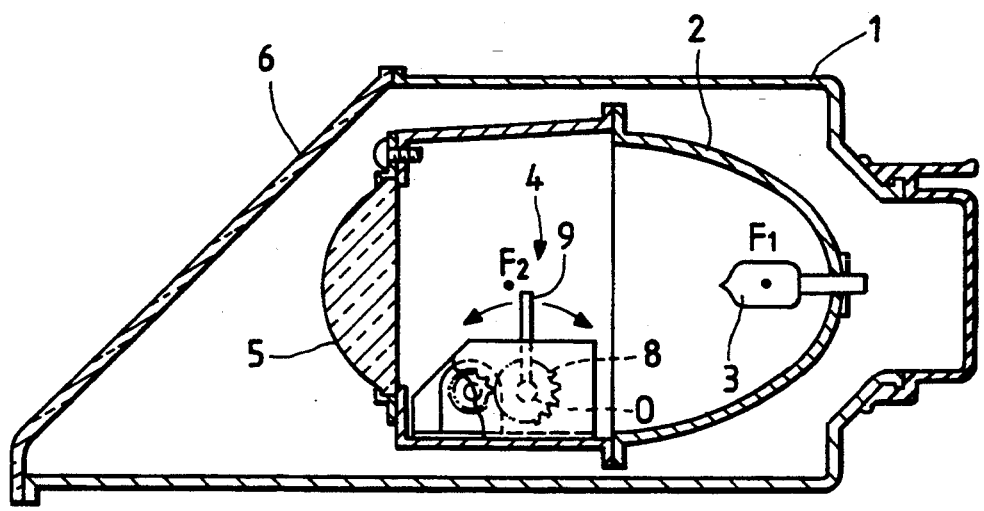
FIG. 19 is a longitudinal sectional view showing a conventional headlamp.

In FIGS. 15 through 18 showing another embodiment of the present invention, in which a headlamp of the invention is incorporated into a leveling device, FIG. 15 is a perspective view showing the inner structure of a projection headlamp for vehicles according to a third embodiment of the present invention, FIG. 16 is a diagram useful in explaining the shape of the shade used in the headlamp of FIG. 15, FIG. 17 is a diagram showing shapes of the clear cut lines in the beam distribution pattern formed by the headlamp, and FIG. 18 is a block diagram showing a motor drive unit.

As shown, the shades 21 and 22, which are coaxially arranged, have a common axis away from the horizontal support shaft 23. When both the shades 21 and 22 are turned together, the clear cut line can be vertically adjusted. In a mode of FIG. 16 where points 21a and 22a are at the highest positions, the clear cut line (denoted as C1L1) is below the horizontal line H on the distribution screen. In another mode where points 21b and 22b are at the highest positions as the result of turning the shades 21 and 22, the clear cut line (denoted as C2L2) is below the horizontal line H.

An inclination sensor S3 is mounted on a vehicle. The inclination sensor S3 is for detecting an inclination of the vehicle with respect to the horizontal state of the vehicle. The output signal of the inclination sensor S3 is applied to a control unit 50. Upon receipt of the output signal, the control unit 50 drives motor drive circuits 51 and 52 for vertically moving the clear cut line in accordance with the inclination detected. When heavy packages are loaded on the trunk room, passengers are sat on the rear seat, or the vehicle is being accelerated, the body of the vehicle is inclined in a state that the fore side of the vehicle body is higher than the rear side (squat mode). In the squat mode, the clear cut line moves up above the horizontal line H in the distribution screen, so that the light beams possibly provide a glare for the oppositely running vehicle. When the vehicle is abruptly braked, the vehicle body is inclined in a state that the rear side thereof is higher than the fore side (node dive mode). In the nose dive mode, the clear cut line moves down below the horizontal line H, so that the driver can see the front under poor illumination by the headlamps. In this case, the inclination sensor S3 senses the inclination of the vehicle body and sends an inclination signal to the control unit 50. Then, the control unit 50 drives the motor drive circuits 51 and 52 to move up or down the clear cut line so as to keep the clear cut line always at the horizontal line when seen from the driver. The remaining construction of this headlamp is substantially the same as that shown in FIG. 11. Hence, no further description of it will be given.

In the motor drive unit shown in FIG. 18, the control unit 50 receives the inclination data from the inclination sensor S3, and sends a signal representative of the inclination to the drive circuits 51 and 52. Alternately, a speed sensor may be used instead of the inclination sensor S3. In this case, the control unit 50 differentiates the speed data from the speed sensor with respect to time, thereby to obtain acceleration data. The acceleration data obtained is applied to the motors drive circuits 51 and 52.

In the embodiments as mentioned above, the shades 21 and 22 are supported by one horizontal support shaft 23. If required, those shafts may be supported by separate support shafts, which are assigned to them.

As seen from the foregoing description, in the projection headlamp for vehicles of the invention, the right and left shades are independently turned. Accordingly, the quantities of the turns of these shades can be independently adjusted. With this function, the invention succeeds in providing a projection headlamp for vehicles having a variety of beam distribution patterns.

What is claimed is:

1. A projection type headlamp, comprising:
   a substantially oval reflector;
   a light source disposed at a first focal point of said reflector;
   a projection lens disposed in front of said reflector; and
   shade means for cutting at a predetermined position a part of light beam emitted from said light source and reflected by said reflector, said shade means being provided between said reflector and said projection lens in the vicinity of a second focal point of said reflector and substantially at a focus point of said projection lens, said shade means rotating along a horizontal axis thereof for forming variable light distribution patterns, said shade means comprising:
   a first shade member rotatably supported on said horizontal axis; and
   a second shade member rotatably supported on said horizontal axis and rotating therealong independently from said first shade member.

2. The projection type headlamp of claim 1, wherein each of said first and second shade members comprises a substantially tubular body.

3. The projection type headlamp of claim 1, wherein at least one of said first and second shade members is eccentrically supported on said horizontal axis.

4. The projection type headlamp of claim 3, wherein merely first shade member is eccentrically supported on said horizontal axis.

5. The projection type headlamp of claim 3, wherein both said first and second shade members are eccentrically supported on said horizontal axis.

6. The projection type headlamp of claim 2, wherein a diameter of said first shade member is different from that of said second shade member.

7. The projection type headlamp of claim 1, further comprising:
   a first drive means for operatively engaging with said first shade member through a first gear means; and,
   a second drive means for operatively engaging with said second shade member through a second gear means separate from said first drive motor.

8. The projection type headlamp of claim 7, wherein said first and second drive means comprise an electric motor controlled by a central processing unit.

* * * * *